United States Patent [19]
Parsons

[11] Patent Number: 4,954,735
[45] Date of Patent: Sep. 4, 1990

[54] LINEAR ACTUATOR

[75] Inventor: Bryan N. V. Parsons, Stoney Stanton, England

[73] Assignee: Jaguar Cars Limited, England

[21] Appl. No.: 366,592

[22] Filed: May 14, 1989

[30] Foreign Application Priority Data

Jun. 16, 1988 [GB] United Kingdom ............... 8814324

[51] Int. Cl.⁵ .................................................. H02K 7/06
[52] U.S. Cl. ........................................ 310/82; 310/83; 74/424.8 R
[58] Field of Search ............. 310/82, 83; 74/424.8 R, 74/424.8 VZ, 424.8 VA

[56] References Cited

U.S. PATENT DOCUMENTS

| 2,556,572 | 6/1951 | Brinkhurst | 74/424.8 |
|---|---|---|---|
| 3,456,139 | 7/1969 | Newell | 310/49 |
| 4,412,794 | 11/1983 | Presley | 310/82 |

FOREIGN PATENT DOCUMENTS 0242102 10/1987 European Pat. Off. .

Primary Examiner—Steven L. Stephan
Assistant Examiner—Judson H. Jones
Attorney, Agent, or Firm—Davis, Bujold & Streck

[57] ABSTRACT

A linear actuator has a screw threaded shaft mounted so that it is restrained from rotational movement, a cage is mounted in sliding relationship on the shaft and an internally threaded member is mounted at one end of the cage in a spherical bearing. The threadform of the internally threaded member is similar to that of the shaft but of larger diameter. The internally threaded member has a skirt formation which extends towards the other end of the cage, a circumferential portion of the skirt formation being made of ferromagnetic material. A series of angularly spaced coils are provided around the cage adjacent the ferromagnetic portion of the skirt formation, the coils being adapted to be energized sequentially so that they will attract the ferromagnetic portion of the skirt formation and cause the internally threaded member to skew so that the threads thereof engage the threads of the shaft, sequential energization of the coils causing the point of contact of the thread of the internally threaded member and shaft to move round thus causing relative rotation and axial movement therebetween.

6 Claims, 1 Drawing Sheet

4,954,735

LINEAR ACTUATOR

BACKGROUND OF THE INVENTION

The present invention relates to linear actuators and in particular to an electromagnetically powered linear actuator.

SUMMARY OF THE INVENTION

According to one aspect of the present invention the linear actuator comprises a screw threaded shaft mounted so that it is restrained from rotational movement, a cage mounted in sliding relationship on the shaft, an internally threaded member mounted towards one end of the cage in a spherical bearing, the threadform of the internally threaded member being similar to that of the shaft but of larger diameter, the internally threaded member having a skirt formation coaxial with the internal thread, said skirt formation extending towards the other end of the cage, at least a circumferential portion of the skirt formation remote from the internally threaded member being made of ferromagnetic material, and a series of angularly spaced coils being provided around the cage adjacent to the ferromagnetic portion of the skirt, said coils being arranged to be energised sequentially, so that they will attract the ferromagnetic portion of the skirt and cause the internally threaded member to skew so that the threads thereof engage the threads of the shaft.

The attraction of the ferromagnetic portion of the skirt formation by the coils as they are energised, skews the internally threaded member with respect to the shaft. Other coils attract radially opposed portions of the skirt formation and while they do not induce any rotary motion, radial oscillation of the skirt formation by sequential energisation of the coils will cause the skew plane of the internally threaded member to rotate about the shaft. When the threads of the internally threaded member and shaft are in frictional engagement, because the thread of the internally threaded member is of greater diameter than that of the shaft, upon rotation of the skew plane of the internally threaded member, relative rotational movement occurs between the internally threaded member and the shaft thus causing the internally threaded member and cage attached thereto, to move axially relative to the shaft.

The speed of rotation of the internally threaded member relative to the shaft will depend upon the relative diameters of the threads of the internally thread member and shaft where they engage, which depends upon the skew angle of the internally threaded member. Reaction between the threads of the internally threaded member and shaft, upon application of an axial load between the shaft and cage, will tend to align the axis of the internally threaded member with that of the shaft. The angle of skew will consequently be a function of the load and the applied magnetic field strength. The skew angle for a given load may consequently be varied by varying the magnetic field strength, thereby varying the drive ratio of the actuator.

BRIEF DESCRIPTION OF THE DRAWINGS

An embodiment of the invention is now described, by way of example only, with reference to the accompanying drawings, in which.

DESCRIPTION OF A PREFERRED EMBODIMENT

Figure 1:
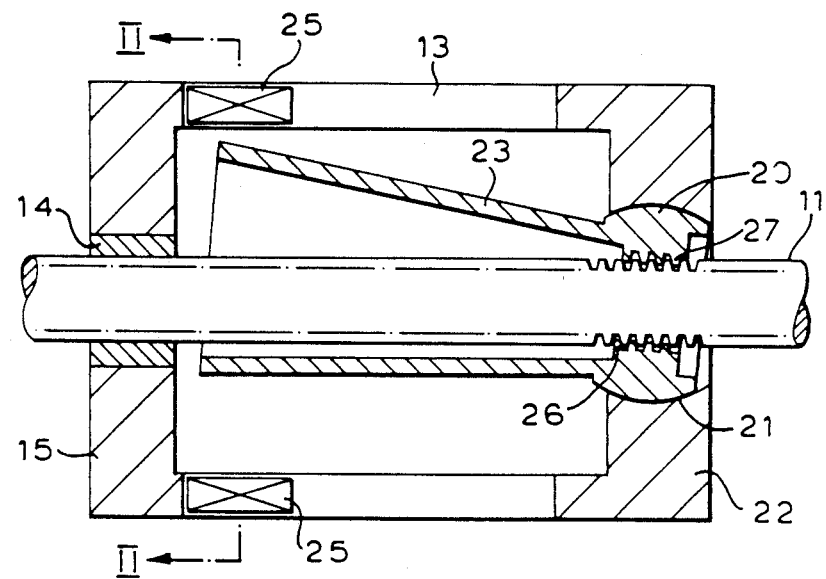
FIG. 1 illustrates in sectional side elevation a linear actuator in accordance with the present invention.
Figure 2:
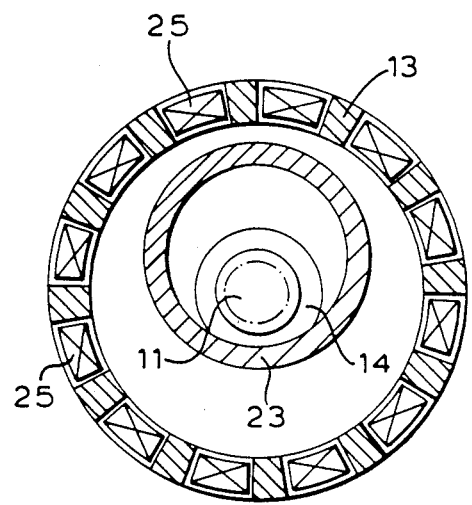
FIG. 2 shows the section along the line II—II, in FIG. 1.

As illustrated in FIG. 1, the linear actuator comprises a shaft 11 which is non-rotatably mounted in suitable manner. The shaft 11 is provided with an acme thread which typically has a profile angle of 29° and flat crests.

A cage 13 is mounted on shaft 11, a bush 14 at one end 15 of cage 13 slidably engaging the flat crests of the thread of shaft 11. An internally threaded member 20 having an acme type thread similar to that of shaft 11 but of larger diameter is mounted in a spherical bearing 21 in the opposite end of 22 of cage 13. The internally threaded member 20 has a skirt formation 23 which extends within the cage 13 towards end 15 thereof. The skirt formation 23 is made from ferromagnetic material.

A series of helically wound coils 25 are angularly spaced about the circumference of the cage 13 adjacent end 15.

When the skirt 23 is disposed coaxially of the shaft 11, the threads of the internal threaded member 20 will engage those of the shaft 11 on a diameter equal to the diameter of the internally threaded member 20. However, when one of the coils 25 is energised the radially opposed ferromagnetic portion of the skirt 23 will be attracted by the magnetic field induced thereby, which will skew the internally threaded member 20 with respect to the shaft 11, so that the threads of the internally threaded member 20 will engage those of the shaft 11 at points 26 and 27 on a diameter which is less than the diameter of the threads of the internally threaded member 20. Energisation of the next coil 25 will then attract the radially opposed ferromagnetic portion of the skirt 23 and so on, so that the skirt 23 will oscillate radially about the shaft 11. As a result of this radial oscillation the plane of skew of the internally threaded member 20 will rotate about the axis of the shaft 11. Although the magnetic fields produced by the coils 25 do not apply a torsional force to the skirt 23, because of the differences in the diameters of; the points of contact 26 and 27 of the threads of the internally threaded member 20 and shaft 11; and the thread of the internally threaded member 20, rotation of the plane of skew will cause relative rotation between the internally threaded member 20 and shaft 11 and consequently the internally threaded member 20 and cage 13 will move axially relative to the shaft 11.

A load bearing member (not shown) may be attached to the cage 13 by means of a low friction bearing, so that the cage 13 is free to rotate relative to shaft 11, the shaft 11 being fixed axially, so that the cage 13 and load bearing member will move axially along the shaft 11. Alternatively, the cage 13 may be fixed axially so that the shaft 11, to which a load may be applied, will move axially.

The speed of axial movement of the cage 13 of shaft 11 will depend upon the rate at which the coils 25 are energised and/or upon the drive ratio of the actuator.

The speed of energisation of the coils 25 may be controlled as desired by, for example, rotary or electronic switching means.

The drive ratio of the actuator will depend upon the difference in diameters of; the points of contact 26 and 27 of the threads of the internal threaded member 20 and shaft 11, and of the internally threaded member 20. For a given threadform, this may be varied by varying the angle of the skew. When a load is applied between the cage 13 and shaft 11, reaction of the points of contact 26 and 27 of the threads will tend to bring the axis of the internally threaded member 20 into alignment with that of the shaft 11. This reaction is opposed by the deflection of the skirt 23 by the magnetic field provided by the coils 25. The magnetic force produced by the coils 25 may thus be varied to vary the angle of skew and thus the drive ratio. Variation of the magnetic force may be achieved by varying the energising currents or by energising a single coil 25 or several adjacent coils 25 simultaneously.

Various modifications may be made without departing from the invention. For example the diameter of the thread of the internally threaded member 20 may be sufficiently great to provide a clearance with the thread of the shaft 11, when the skirt 23 is coaxial with the shaft 11, so that when none of the coils 25 are energised, the internally threaded member 20 and cage 13 may be moved freely along the shaft 11, while upon energisation of the coils 25, the threads of the skewed internally threaded member 20 will engage those of the shaft 11. Also, in place of the bush 14, the cage 13 may be supported on shaft 11 by means of a roller or ball bearing, the inner race of the bearing being slidably located on the flat crests of the thread on the shaft.

It will be appreciated, that the spherical bearing 21, threads of the internally threaded member 20 and shaft 11, cage 13 and skirt 23 should be dimensioned such that at maximum skew, the skirt 23 will be clear of shaft 11 and cage 13.

I claim:

1. A linear actuator comprising a screw threaded shaft mounted so that it is restrained from rotational movement, a cage mounted in sliding relationship on the shaft, an internally threaded member mounted towards one end of the cage in a spherical bearing, the threadform of the internally threaded member being similar to that of the shaft but of larger diameter, the internally threaded member having a skirt formation coaxial with the internal thread, said skirt formation extending towards the other end of the cage, at least a circumferential portion of the skirt formation remote from the internally threaded member being made of ferromagnetic material, and a series of angularly spaced coils being provided around the cage adjacent to the ferromagnetic portion of the skirt, said coils being arranged to be energised sequentially, so that they will attract the ferromagnetic portion of the skirt and cause the internally threaded member to skew so that the threads thereof engage the threads of the shaft.

2. A linear actuator according to claim 1 in which the magnetic field produced by the coils is varied by varying the energising current.

3. A linear actuator according to claim 2 in which the magnetic field produced by the coils is varied by energising a single coil or a series of adjacent coils.

4. A linear actuator according to claim 1 in which the shaft is fixed axially and the internally threaded member and cage move along the shaft, load bearing means being provided on the cage.

5. A linear actuator according to claim 4 in which the load bearing means is mounted to the cage by low friction means which will permit rotation of the cage relative to the load bearing member.

6. A linear actuator according to claim 1 in which the cage is fixed axially and the shaft moves axially of the internally threaded member.

* * * * *